United States Patent [19]
Torok et al.

[11] 4,386,728
[45] Jun. 7, 1983

[54] HERMETIC SEALING OF ABUTMENT JOINTS BY NON-VACUUM FOCUSED ENERGY WELDING

[75] Inventors: George E. Torok, Clarence, N.Y.; Ernest Gajdusek, Jr., Lemoyne, Pa.

[73] Assignees: Houdaille Industries, Inc., Fort Lauderdale, Fla.; by said George E. Torok; Leybold-Heraeus Vacuum Systems, Inc., Enfield, Conn.; by said Ernest Gajdusek, Jr.

[21] Appl. No.: 254,288

[22] Filed: Apr. 15, 1981

[51] Int. Cl.³ .................. B23K 26/16; B23K 33/00
[52] U.S. Cl. ..................... 228/111; 219/121 ED; 219/121 LD; 219/137 R; 228/135; 228/168
[58] Field of Search ............. 228/110, 111, 135, 136, 228/168; 219/137 R, 121 ED, 121 LD, 121 PK

[56] References Cited

U.S. PATENT DOCUMENTS

| | | | |
|---|---|---|---|
| 2,514,139 | 7/1950 | O'Connor | 74/574 |
| 2,724,893 | 1/1955 | O'Connor et al. | 29/511 |
| 3,436,515 | 4/1969 | Sayer et al. | 219/121 ED |
| 3,512,612 | 5/1970 | Bragg et al. | 188/1 |
| 4,019,242 | 4/1977 | Zook et al. | 219/121 ED |
| 4,097,716 | 6/1978 | Reichelt, Jr. et al. | 219/137 R |
| 4,117,300 | 9/1978 | Ricards | 219/121 LD |
| 4,255,641 | 3/1981 | Connell et al. | 219/137 R X |

FOREIGN PATENT DOCUMENTS 47-724  1/1972  Japan ................ 219/121 ED

OTHER PUBLICATIONS

The Procedure Handbook of Arc Welding, 12th Edition, The Lincoln Electric Company, Jun. 1973, "Submerged-Arc Process, 6.3-17".

*Primary Examiner*—Kenneth J. Ramsey
*Attorney, Agent, or Firm*—Hill, Van Santen, Steadman, Chiara & Simpson

[57] ABSTRACT

A method of hermetically sealing by NVFE (non-vacuum focused energy) welding abutment joints formed by elongate surfaces. At substantially spaced intervals narrow shallow vent grooves are formed across one of the surfaces, while leaving between the vent grooves separating lengths of many times the length of the groove width. The grooves enable the NVFE welding to be effected continuously in unidirectional pass along the joint, the gases venting from the joint through the successive vent grooves as the welding progresses continuously along the joint. Continuously after the venting of the gases at each of the successive vent grooves, each vent groove is sealed by the NVFE welding without interrupting the welding progression.

14 Claims, 6 Drawing Figures

HERMETIC SEALING OF ABUTMENT JOINTS BY NON-VACUUM FOCUSED ENERGY WELDING

This invention relates to the art of hermetic sealing of abutment joints by welding, and is more particularly concerned with effecting such sealing by non-vacuum focused energy welding, i.e. NVFE (non-vacuum electron beam, ultrasonic vibration, laser beam, or like welding) where the welding is accomplished at high speed with minimum heating of material outside of the narrow band where fusion is desired.

Intense heat is generated in producing a welded joint, causing certain impurities in or on the material being welded to gasify and also causing expansion of any gases such as air present in the joint. Unless such gas is permitted to escape freely from the joint as the welding progresses, some of the gas may be trapped in the weld and cause porosity. Any such porosity is highly undesirable where a hermetically sealed joint is necessary in or as part of a barrier against leakage of a fluid as, for example, through a wall of a container, conduit or the like.

Typically, torsional vibration dampers such as disclosed in U.S. Pat. No. 2,514,139, in which relatively rotatable members are coupled by means of viscous damping medium, e.g. a silicone fluid of suitable viscosity, require that fluid containment joints between working chamber housing parts such as a casing and a cover be sealed with the utmost security against leakage because internal pressures of a high order may develop in the course of operation, and any leakage of fluid will seriously hamper or even destroy efficiency of the damper. As indicated in that patent, all joints were intended to be welded by obviously the conventional weld wire or filler metal welding process which requires intense heating of the weld area to an extent affecting much of the adjacent portions of the parts not directly involved in the fusion zone of the weld. As a result, undesirable warpage was often experienced, sometimes to the extent of causing rejection of the welded unit. Since these dampers are fairly costly units, rejects cause serious economic loss.

In order to overcome the disadvantages of the weld wire or filler metal welding, the hermetic closure and sealing arrangement of U.S. Pat. No. 2,724,893 was adapted with significant success. According to that patent the casing within which is provided a working chamber housing an annular inertia member is open at one side and is closed by an annular cover which seats on stepped or rabbet groove radially inner and radially outer shoulders. Annular lip flanges are turned over as by a spinning operation onto the radially inner and radially outer edge portions of the cover, with a sealing medium trapped in the joint by the turned over flanges. While effective, this method of sealing the joints is slow and time consuming, as well as limited to the types of structures and materials to which the method may be applied.

According to a later U.S. Pat. No. 3,512,612 the parts of the housing are secured together by using the vacuum electron beam welding technique wherein the welding is accomplished in a vacuum chamber which removes the gases which are generated in the weld joint during the welding procedures. It will be noted that according to this patent disclosure the welding is effected through the parts; and where the cover for the housing is involved, the welding is through the cover into the housing so that there is little chance of trapping gases. On the other hand, where the cover is applied to a stepped shoulder as in the aforesaid U.S. Pat. Nos. 2,514,139 and 2,724,893, there is a problem of gas entrapment in the joint with the likelihood of porosity, sometimes referred to as blow-holes, unless the welding is effected in a vacuum, or at a slow rate by non-vacuum welding and on a slip-fit joint. In such a slip-fit joint there is a gap in the unwelded joint through which the welding generated gases can escape.

However, in order to take utmost advantage of electron beam welding or any other focused energy type of welding, the welding speed should be the maximum attainable and the area of welding fusion should be as limited as possible to confine to a minimum the area heated and avoid detrimental warpage. To this end, the joint being welded should be as tight as practicable, that is the parts should be in abutment at the joint. Such an abutment joint is attainable by press-fit, but even in a press-fit there is some air present in the joint. Such air together with any impurities that may be present on the surface of or in the metal and thus subject to gasification during welding, create a problem in that the gas must escape from the fusion area of the joint while such area is still in the fused state. If the gas is trapped in the weld joint, gas pockets or blow-holes and porosity will defeat the intended hermetic seal. As a matter of fact, such a porosity problem has been encountered in attempting to attain hermetically sealed stepped shoulder joints by non-vacuum focused energy welding, and it is to the solving of that problem that the present invention is directed.

We have not found any solution for the problem in the patent literature. The only relevant disclosure we have located in other publications has been noted in "The Procedure Handbook of Arc Welding" 12th Edition, June, 1973, which was published as a service to industry and education by The Lincoln Electric Company of Cleveland, Ohio. At page 6.3–17 of that publication under the general heading of "Submerged-Arc Process", it is stated that preferred practice is to avoid press fits in joints to be welded and to allow a gap of up to 1/32 inch. If press fits must be used, it is stated that one piece should be knurled to allow a path for gases to escape since parts that are joined by a press fit are usually coated with a lubricant, such as white lead prior to mating, and if a weld is then made in the vicinity of the press fit, the lubricant gives off gases that cause porosity, usually large holes at or near the end of the weld. In the submerged arc process, filler metal welding is effected. Therefore, the filler metal will readily fill in the spaces between the numerous closely spaced series of small ridges or beads providing the knurling on the metal surface. Knurling is impractical for NVFE welding, because the whole purpose is to secure rapid, narrow band fusion of the abutting surfaces. In other words, unless the surfaces at the joint are to a major extent in uninterrupted press fit abutment, too wide a band of the adjoining pieces must be brought into the fusion state, causing undesirable heating involvement of the areas of the parts outside of the welding zone. Knurling is a costly process, especially where the affected joints are of extensive length such as on large diameter parts to be welded together.

An important object of the present invention is to provide as nearly as practicable thoroughly hermetically sealed abutment joints at high speed, efficiently, and economically by non-vacuum focused energy welding, especially where the joint involves a stepped juncture.

A method of hermetically sealing an abutment joint between two elongate surfaces by NVFE (non-vacuum focused energy) welding, according to the present invention, comprises providing at substantially spaced intervals narrow shallow vent grooves across one of said surfaces while leaving between said vent grooves separating lengths of said one surface and each of which lengths extends between a pair of the grooves many times the groove width, effecting substantially uninterrupted abutment joint contact of said surfaces along each of said lengths, NVFE welding the abutment joint in a continuous unidirectional pass therealong, venting gases from the abutment joint through the successive vent grooves as said welding progresses continuously along said joint; and continuously after the venting of the gases at each of the successive vent grooves, sealing each vent groove by said NVFE welding without interrupting the welding progression.

Other objects, features and advantages of the invention will be readily apparent from the following description of a certain representative embodiment thereof, taken in conjunction with the accompanying drawing although variations and modifications may be effected without departing from the spirit and scope of the novel concepts embodied in the disclosure and in which.

Figure 1:
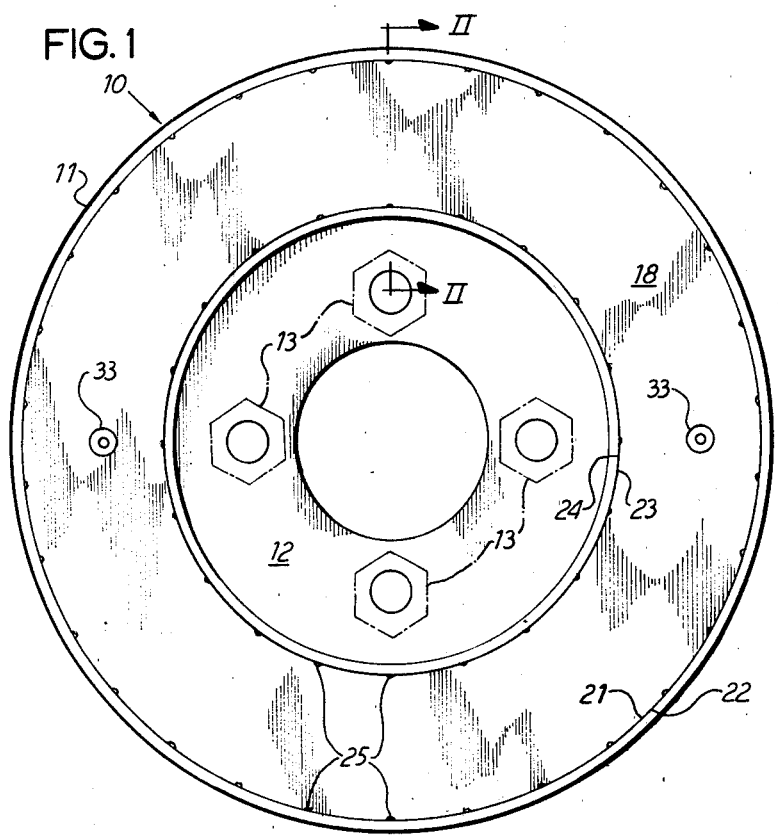
FIG. 1 is a plan view of a representative article, in this instance a viscous torsional vibration damper, adapted to be made according to the present invention.
Figure 2:
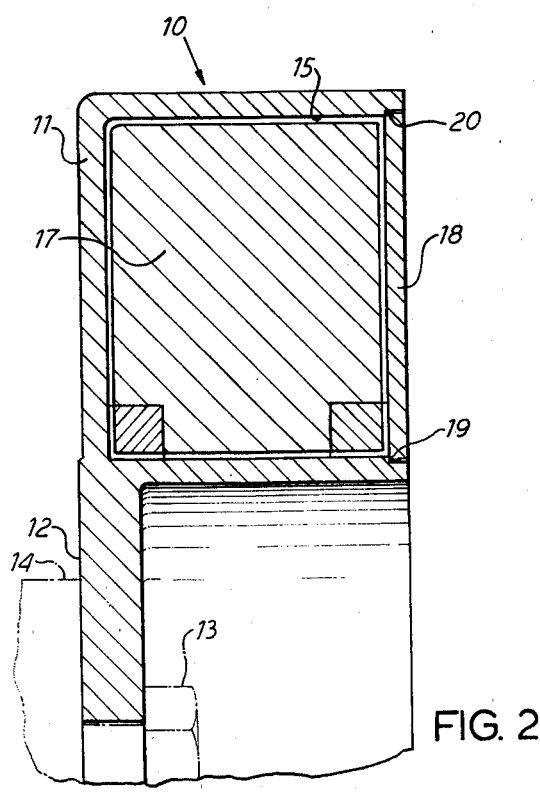
FIG. 2 is an enlarged fragmentary sectional detail view taken substantially along the line II—II of FIG. 1.

Although the improvements in NVFE welding now to be further described, are not to be limited to the making of any particular article, especially advantageous utility has been found in the production of viscous torsional vibration dampers, and, therefore, by way of example the invention will be described in detail in connection with the making of such a damper identified at 10 in FIGS. 1 and 2. Typically, the damper comprises an annular housing 11 having a central hub flange 12 which is adapted to be secured as by means of bolts 13 to the end of a rotary member such as an internal combustion engine crankshaft 14. Within the housing 11 is defined an annular working chamber 15 within which is relatively rotatably mounted an inertia ring member 17. A viscous damping medium such as a silicone fluid of suitable viscosity is filled into the working chamber 15 and provides shear coupling films of the viscous fluid between parallel relatively torsionally movable confronting surfaces of the housing 11 within the chamber 15 and the inertia ring member 17.

At one axial side of the working chamber 15, the housing 11 is initially open for the purpose of receiving the inertia ring member 17 into assembly within the chamber 15, whereafter the opening is closed by means of an annular cover 18 which, in order to retain the viscous coupling fluid, must be hermetically sealed in place. For this purpose, the housing 11 is provided at its initially open side and about the opening into the chamber 15 with a stepped rabbet groove axially outwardly facing shoulder 19 at the radially inner side of the opening, and at the radially outer side of the opening with a similar axially outwardly facing rabbet groove shoulder 20. To receive the radially inner and radially outer edges of the cover 18 flush with the axially outer surfaces of the housing 11 adjacent to the shoulders 19 and 20, the depth of the shoulders is desirably substantially equal to the thickness of the cover 18. In one desirable form of the damper 10, the outside diameter of the cover 18 may be about 12", while the inside diameter of the cover 18 may be about 7½", the cover thickness being about 5/32", and the shoulders 19 and 20 about 1/16" in width, respectively. For attainment of utmost hermetic sealing efficiency, an axially extending and radially inwardly facing, preferably cylindrical surface 21 defining the rabbet groove for the shoulder 20 is engaged in press fit abutment by a complementary axially extending and radially outwardly facing edge surface 22 on and about the radially outer perimeter of the cover 18. To the same effect, a radially outwardly facing, axially outwardly extending annular preferably cylindrical surface 23 defining the rabbet groove for the shoulder 19 receives in pressfit abutment a complementary axially outwardly extending and radially inwardly facing radially inner edge surface 24 on the cover 18.

In a desirable construction for its intended purpose as a cover for the damper 10, the cover 18 may comprise a low carbon (S.A.E. 1008-1020) aluminum-killed steel, which is adapted to be economically fine blanked.

Figure 3:
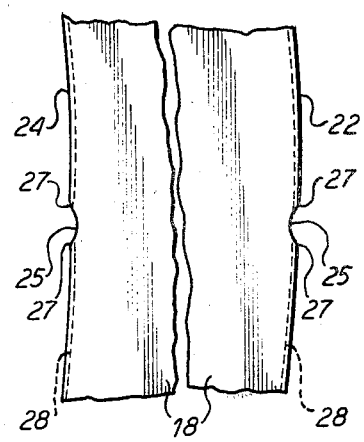
FIG. 3 is an enlarged fragmental plan view of a portion of the cover of the article shown in FIG. 1.

As blanked, the cover 18 is provided across its edge surfaces 22 and 24 at substantially spaced intervals with narrow shallow vent grooves 25 which will enable sufficient venting of gases during non-vacuum focused energy welding of the abutment joints between the circumferentially elongate surfaces 21 and 22 on the one hand, and the surfaces 23 and 24 on the other hand. Between the vent grooves 25 separating lengths of the surfaces 22 and 24 intervene between the vent grooves 25, and such separating lengths of the surfaces extend many times the groove width. In a practical construction, the grooves 25 may each be of about 0.004" to 0.006" in depth and formed on a radius of about 0.020" to 0.022". At their opposite sides, the grooves 25 join the respective surfaces 22 and 24 on reverse radius 27 (FIG. 3). This arrangement of the grooves greatly facilitates forming the grooves as a part of the fine blanking of the cover, and without requiring forming of the grooves 25 as a separate step in the manufacture of the cover 18. In a practical arrangement, in a cover size of the dimension described, the grooves 25 may be spaced about 1" to 2" apart, that is, at about 12° to 18° intervals along the edges of to cover. For example, along the radially outer edge surface 22, the grooves 25 may be at about 12° intervals, while at the radially inner edge surface 24, the grooves 25 may be located at about 18° intervals.

In assembling the cover 18 with the housing 11, the cover is centered with respect to the opening from the chamber 15, aided by axially inner corner chamfers 28. Then by relative axial press fitting pressure, the cover 18 is forced onto the shoulders 19 and 20, and the surfaces 22 and 24 of the cover are forced into substantially uninterrupted joint abutment along the lengths thereof between the grooves 25 with the housing surfaces 21 and 23, respectively. To assure that any tendency toward warpage during welding will be avoided, the cover 18 may be further secured, after the press fitting into the damper housing 11 by means of a suitable tack welding operation, such as the tungsten inert gas arc-weld technique, at a few widely separated points, enough to prevent any tendency for the cover 18 to displace from the shoulders 19 and 20 during subsequent NVFE welding. It will be understood, of course, that the inertia member 17 will have been loaded into the chamber 15 before the cover 18 is secured in closing relation to the chamber 15.

After assembly of the cover 18 with the housing 11 has been completed, the assembly is ready for hermetically sealing the abutment joints by NVFE welding. For this purpose, the assembly is placed in position relative to an NVFE focusing device 29, which may be of any preferred type capable of focusing an electron beam, ultrasonic vibrations, laser beam, or like heating or heat generating energy to the joint to effect fusion of the abutting surfaces. Relative continuous unidirectional movement is effected between the device 29 and the joint to be welded at as high a speed as the welding can be effected and in as narrow a welding zone along the joint as practicable. As shown schematically in FIG. 6, a non-vacuum focused energy welding beam 30 is projected by the device 29 to a sufficient depth along the joint to effect a narrow weld 31 involving only a narrow area of the material along the abutting surfaces at the joint and thus minimizing the heating involvement of the adjoining areas of the members being welded. As the continuous unidirectional welding pass progresses along the joint, gases are vented from the joint through the successive vent grooves 25.

Figure 5:
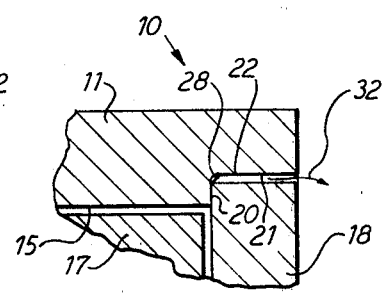
FIG. 5 is a fragmentary sectional detail view taken substantially along the line V—V of FIG. 4.
Figure 4:
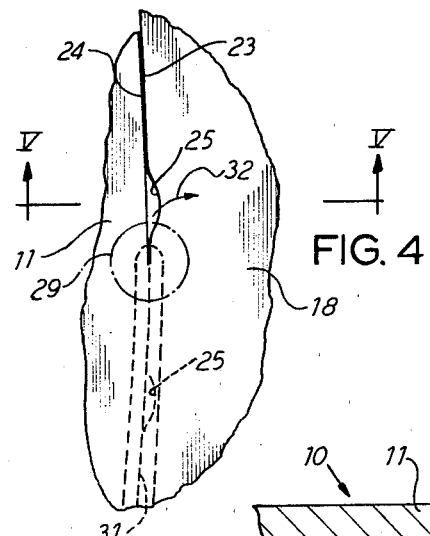
FIG. 4 is a fragmentary plan view demonstrating non-vacuum focused energy welding of one of the abutment joints of the article of FIG. 1.
Figure 6:
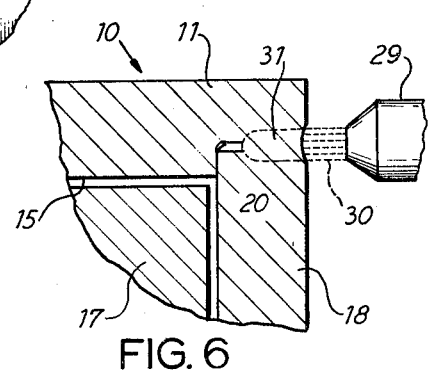
FIG. 6 is a view similar to FIG. 5, but schematically demonstrating the NVFE welding in progress.

As schematically demonstrated in FIGS. 4 and 5, as the NVFE welding beam 30 approaches each of the grooves 25, gases which tend to be driven ahead of the point of welding fusion escape from the vent grooves 25 as indicated by the arrows 32. Then, continuously after the venting at each of the vent grooves 25, such vent grooves are weldingly sealed, as indicated in FIG. 6, without interrupting the welding progression. The depth of the grooves 25 is desirably no greater than the width of involvement in the welding fusion of the material of the cover 18 along the joint. Therefore, the grooves 25 are respectively successively filled-in by the fused material as the welding progresses and without requiring filler material.

It will thus be apparent that welding of the press fit joints can be effected at high speed, continuously from end-to-end of the joint in each instance by means of the NVFE welding. By virtue of the spaced narrow shallow vent grooves 25, gases are efficiently purged from the grooves as the welding progresses without interruption along each joint.

After the cover has been welded in place, the damper is tested, as is customary, to assure that the joints are leak-free. Then viscous damping fluid is filled into the working chamber 15 through filler openings 33 in the cover 18, and the openings sealed.

It will be understood that variations and modifications may be effected without departing from the spirit and scope of the novel concepts of this invention.

We claim as our invention:

1. A method of hermetically sealing by NVFE (non-vacuum focused energy) welding, an abutment joint formed by two elongate surfaces comprising:
providing at substantially spaced intervals narrow shallow vent grooves across one of said surfaces while leaving between said vent grooves separating lengths of said one surface and each of which lengths extends between a pair of the grooves many times the groove width;
effecting substantially uninterrupted abutment joint contact of said surfaces along each of said lengths;
NVFE welding the abutment joint in a continuous unidirectional pass therealong;
venting gases from the abutment joint through the successive vent grooves as said welding progresses continuously along said joint;
and continuously after the venting of the gases at each of the successive vent grooves, sealing each vent groove by said NVFE welding without interrupting the welding progression.

2. A method according to claim 1, which comprises forming said vent grooves with a shallow curvature from side to side.

3. A method according to claim 2, which comprises providing a reverse curvature juncture with each of the separating lengths of said one surface at each side of said grooves.

4. A method according to claim 1, which comprises seating a member having thereon said one surface against a shoulder on another member having thereon the other of said surfaces, and said grooves opening from said joint in the opposite direction from said shoulder.

5. A method according to claim 1, which comprises forming said grooves at spaced intervals of about 1 to 2 inches.

6. A method according to claim 5, which comprises forming said vent grooves to a depth of from 0.004 to 0.006 inch.

7. A method according to claim 1, which comprises NVFE welding a joint between a housing of a viscous torsional vibration damper defining a working chamber therein and a cover closing said working chamber.

8. A method according to claim 7, wherein said housing has an initial annular axially directed opening and said cover is of complementary annular form having radially inner and radially outer edges, providing said narrow shallow vent grooves at substantially spaced intervals along each of said cover edges, effecting press fit engagement of each of said edges with complementary surfaces on said housing about said opening, and effecting NVFE welding of the joints between each of said cover edges and said complementary housing surfaces.

9. A method of making a viscous torsional vibration damper having a housing defining a working chamber accommodating an annular inertia mass in relatively rotatable relation, and the housing having an axial opening through which the inertia mass is loaded into the working chamber, there being an annular cover for said opening and the housing having at the radially inner and radially outer sides of said opening axially outwardly facing annular shoulders and axially extending substantially cylindrical rabbet groove surfaces respectively associated with said shoulders, and an annular cover for closing said opening, comprising:
providing at substantially spaced intervals narrow shallow vent grooves across each of radially inner and radially outer edge surfaces on the cover and leaving between said vent grooves separating lengths of said edge surfaces and each of which lengths extends between a pair of the grooves many times the groove width;

assembling said cover by press fitting and effecting substantially uninterrupted abutment joint contact of said edge surfaces along each of said lengths with said axially extending rabbet groove surfaces and bottoming said cover against said shoulders;

NVFE welding each of the press fit abutment joints in a continuous unidirectional pass along each joint;

venting gases from the abutment joints through the successive vent grooves as said welding progresses continuously along each joint;

and continuously after the venting of the gases at each of the successive vent grooves, sealing each vent groove by said NVFE welding without interrupting the welding progression.

10. A method according to claim 9, which comprises forming each of said grooves on a shallow radius.

11. A method according to claim 10, comprising forming a convex juncture at each side of each of the grooves with the adjoining separating lengths.

12. A method according to claim 9, wherein said cover has a radially outer diameter of about 12" and a radially inner diameter of about 7.5", which comprises providing said vent grooves at from 1" to 2" intervals along said cover edge surfaces, and forming said grooves to a depth of 0.004" to 0.006".

13. A method according to claim 12, which comprises fine blanking said cover and forming said grooves simultaneously with the blanking.

14. A method according to claim 9, comprising fine blanking said cover and forming said grooves simultaneously with the blanking.

* * * * *